United States Patent [19]

Andrew et al.

[11] Patent Number: 4,533,333
[45] Date of Patent: Aug. 6, 1985

[54] HELICOPTER EXTRACTABLE COLD WEATHER/WATER LIFERAFT

[75] Inventors: Wesley A. Andrew, Woodbridge; Curtis E. Shields, Virginia Beach; Harry O. Hindlin, Virginia Beach; Robert Hamilton, Virginia Beach, all of Va.

[73] Assignee: The United States of America as represented by the Secretary of the Navy, Washington, D.C.

[21] Appl. No.: 176,376

[22] Filed: Aug. 8, 1980

[51] Int. Cl.³ .................................................. B63C 9/04
[52] U.S. Cl. ...................................................... 441/38
[58] Field of Search ..................... 9/5, 4 R, 4 A, 2 A, 9/8 R, 11 R, 11 A, 14; 441/35, 37, 38, 40; 114/345, 348, 349, 350

[56] References Cited

U.S. PATENT DOCUMENTS

| | | | |
|---|---|---|---|
| 2,970,324 | 2/1961 | Phillips | 9/11 A |
| 3,259,926 | 7/1966 | Otterman | 9/4 R |
| 3,883,913 | 5/1975 | Givens | 9/11 A |
| 4,124,181 | 11/1978 | Kolwey | 9/14 |

Primary Examiner—Jesus D. Sotelo
Attorney, Agent, or Firm—R. F. Beers; E. F. Johnston; T. G. Keough

[57] ABSTRACT

An inflatable liferaft improves disaster victims' chances of survival, particularly in cold waters. Three inflatable ribs support a layered canopy from the sides of the raft to assure protection from the elements. A highly reflective coating or an equivalent space-blanket type material is provided on the inside of the canopy to help keep the occupants warm and act as a radar reflector. The inflatable ribs also aerodynamically shape the raft to stabilize it in high wind states and while being towed through the air by a rescue helicopter. A hoisting harness cradles the bottom and sides of the raft and is connected to an enlarged hoisting eye located overhead or floating on the water to assure an unassisted, reliable engagement by a helicopter-born hook. After the hook has engaged the hoisting eye and as the harness lifts the raft from the water, a number of covers located along the bottom of the raft's hemispherical ballasting chamber are pulled from their respective openings to allow the rapid dumping of ballast water. Thusly relieved of this load, the helicopter can rapidly transport the survivors to a medical facility. Because the liferaft is plucked from the water intact, the incapacitated have a better chance of survival and the others along with the rescue team are not exposed further to cold water or the helicopter's downwash.

7 Claims, 7 Drawing Figures

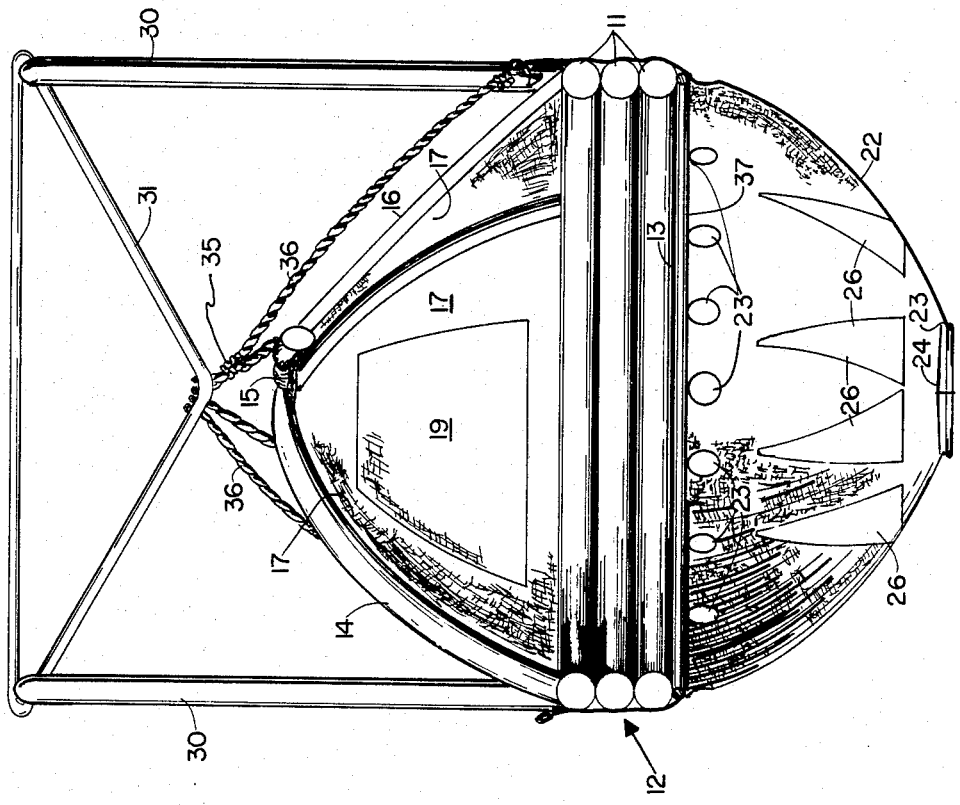
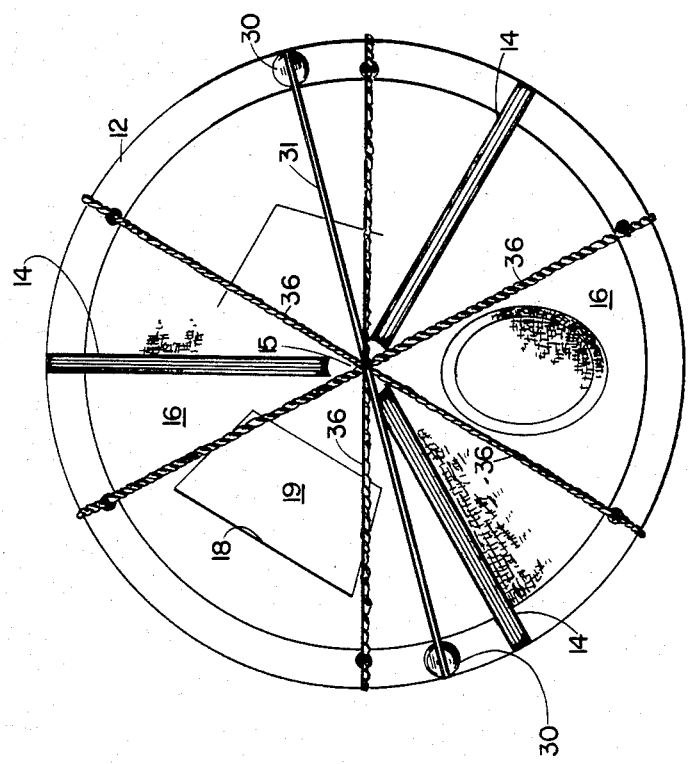
FIG.2
FIG.3a

HELICOPTER EXTRACTABLE COLD WEATHER/WATER LIFERAFT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Over the years, emergency lifesaving and rescue craft have evolved from large cumbersome rigid lifeboat-like structures to a variety of types generically classified under the designation, liferafts. An early widely used design had a rigid, rectangularly shaped balsa flotation member with a webbing connecting opposite sides across the middle. These were hung or piled wherever there was space and, when a ship went down, they would float free. The few survivors who might clamber aboard would be at the mercy of the elements. From those who were not drowned as wind and waves repeatedly capsized or washed over the rafts, hypothermia took its toll. A family of inflatable rafts were developed primarily to reduce the space otherwise occupied by the rigid ones. Yet, since they were similar in design, lifeless or empty rafts often were all that search parties found.

One noteworthy attempt to provide a degree of protection against ice and cold weather was disclosed by Robert Bicknell et al., in U.S. Pat. No. 2,908,919. An inflatable liferaft was intended for colder climes so had two-ply insulative panels arranged to form a dome shaped chamber. Double walls, inflatable ribs and inflatable hatches were thought to provide a snug respite in stormy seas. As a matter of fact, the Bicknell et al., raft was thought to be such a cozy structure, it was intended to be a shelter upon its inhabitants' landfall. It even included a ballasted boarding ramp for ease of access and, along with a number of circumferentially disposed water ballast buckets, was said to be stable. Although the ballasting means were hoped to stabilize the liferaft in heavy sea states and severe winds, actual demonstrations raised doubts as to their ability to handle this problem. Furthermore, when the survivors were rescued at sea from a helicopter, they would have to jump into the sea to put on a rescue harness since it is nearly impossible to drop a rescue line through the hatchway of a bobbing raft. The cold water immersion in the wind further reduces a victim's possibility of survival. Added to this, the downwash from the helicopter increases the chances of hypothermia. Usually the victim's numbness prevents their donning the harness or renders them unconscious. Frequently, a rescue crewman must jump into the water and attach the harness, particularly with the incapacitated. Now, the crewman must be rescued with all the problems associated with such a hazardous exposure.

A somewhat similar design was patented by R. J. Phillips in U.S. Pat. No. 2,970,324. His liferaft had an inflatable central strut holding up a canopy and mounting a small shackle joined to a number of straps. Each of the straps is sewn to a load-spreading piece which reaches around and is secured to the extremity of the raft. A further set of straps coupled to load-spreading pieces on the raft floor was provided to distribute a load. This arrangement was to allow the launching of the inflated raft over the side of a ship or the like after being loaded with passengers. The small shackle mounted on the strut is suitable for interconnection to a ship's crane only by an attendant standing on a relatively stable surface. It is certainly not suited for engagement to an aircraft as the raft bobs on the ocean's surface. Additionally, this design appears to be vulnerable to the effects of wind and surface wave action. A later design is shown by Rex Smith in his "Inflatable Liferafts" of U.S. Pat. No. 3,222,700. He has a bridle cemented to the underside of a floor at spaced positions around the gunwale of his raft. An additional webbing bridle aids in the lowering of a loaded liferaft. Although it is purported that survivors can be hauled up to a deck by making an attachment with a shackle, its size, location and manner of attachment make such an operation nearly impossible in high sea and wind states by a surface craft, let alone a helicopter. Several peripherally disposed buoyancy chambers optimistically seek to resist the effects of wind and waves and inflatable members help shape the dimensions of a topless canopy.

A more recently developed inflatable liferaft includes lifesaving capabilities that mark it a major advance in lifesaving equipment for sea emergencies. It is known as the "Givens Buoy Raft" and is marketed by Res-Q-Raft, Inc. of Portsmouth, R.I. Simply stated, the raft combines several proven features for increasing the survivability of disaster victims. Its compact size and quick inflation time make it suitable for aircraft and other applications where space is at a premium. An inflatable double floor, double canopy and three arch tubes protect its occupants from exposure to wind and water. A hemispherical ballasting chamber self-fills with water so that the raft will not flip over in heavy winds or heavy seas nor will it overturn as survivors are crawling aboard. Recent approval by the United States Coast Guard further attests to its worth. However, like the preceding rafts, when the survivors are being rescued from the raft by a helicopter, they frequently must jump into the numbing water to put on a hoisting sling. Often times the victims are so fatigued and numbed from the exposure of the ordeal that they are incapable of fastening a hoisting sling about themselves. Those who are incapacitated by injury further complicate recovery. A helicopter crewman or swimmer must jump into the water and make the hoisting line attachment. The hundred knot plus helicopter downwash, icy waters and other winds can quickly bring on hypothermia for both the victim and the would be rescuer. During the time it takes for the lifting harness to be attached to a weakened victim, the victim to be retrieved and taken out of the harness, and the harness again to be lowered for the crewman and his recovery, a strong possibility exists that one if not both might become fatalities. The odds that some fatalities will occur increase dramatically as the number of survivors in the raft increases or if any are incapacitated. Irrespective of the fact that the raft's occupants have survived a disaster and a long withering exposure to the elements, it is a too often repeated tragedy that they perish when rescue seems so near at hand.

Thus, there is a continuing need in the state of the art for a liferaft affording a considerable degree of protection from the elements while being stable enough to withstand the effects of wind and wave action which facilitates the final stages of recovery by not needlessly subjecting the survivors to additional exposure.

SUMMARY OF THE INVENTION

The present invention is directed to providing an improvement for a liferaft having a base supporting sides above and a ballasting chamber below for protecting survivors from exposure. A means extends beneath and across the base and terminates above the raft for cradling it and its occupants in a supporting manner. Means is disposed at the termination above the base and sides of the liferaft for positioning a portion to engage a lifting hook and a means is disposed on the ballasting chamber for providing at least one opening for dumping water from the ballasting chamber as the liferaft is lifted from the water by the lifting hook. Thus, the liferaft and its occupants can be retrieved by, for example, a helicopter, without further exposure to allow more effective treatment at a remote aid station. A reflective coating on the inside of a canopy helps prevent hypothermia.

It is a prime object of the invention to provide an improvement for liferafts.

Another object is to provide an improvement for inflatable liferafts which reduces the exposure to survivors.

Another object of the invention is to reduce the hazards attendant to final stages of the rescue operation.

Still another object is to afford a relatively high degree of protection from the elements to reduce the problems associated with hypothermia.

Yet another object is to provide an inflatable liferaft having double walls and coatings for reducing the effects of wind and water.

A further object is to provide a liferaft having a space-blanket-like coating for reducing hypothermia.

Another object is to provide a liferaft capable of being retrieved in its entirety by a helicopter.

A further object is to provide a liferaft having a portion for engaging the lifting hook of a helicopter to assure the complete recovery of the liferaft and its occupants without additional exposure.

Still another object is to provide a liferaft which is stable in high sea and wind states by the inclusion of a ballasting chamber which dumps the ballast upon withdrawal from the water by a helicopter.

Another object is to provide a liferaft that contains the survivors throughout the final stages of a rescue operation and thereby increases their chances for survival.

A further object is to provide an improved liferaft recovered in its entirety and towed through the air in an aerodynamically stable configuration.

These and other objects of the invention will become more readily apparent from the ensuing description when taken with the drawings and appended claims.

BRIEF DESCRIPTION OF THE DRAWINGS

FIG. 2 is a cross-sectional view of the invention taken generally along lines 2—2 in FIG. 1.

FIG. 3a is a plan view of the invention showing the spatial disposition of the inflatable ribs, the upper portions of the cradling means, the hoisting eye and its supporting structure.

FIG. 3b is a bottom view of the invention showing the radially converging cradling means.

DESCRIPTION OF THE PREFERRED EMBODIMENTS

Figure 1:
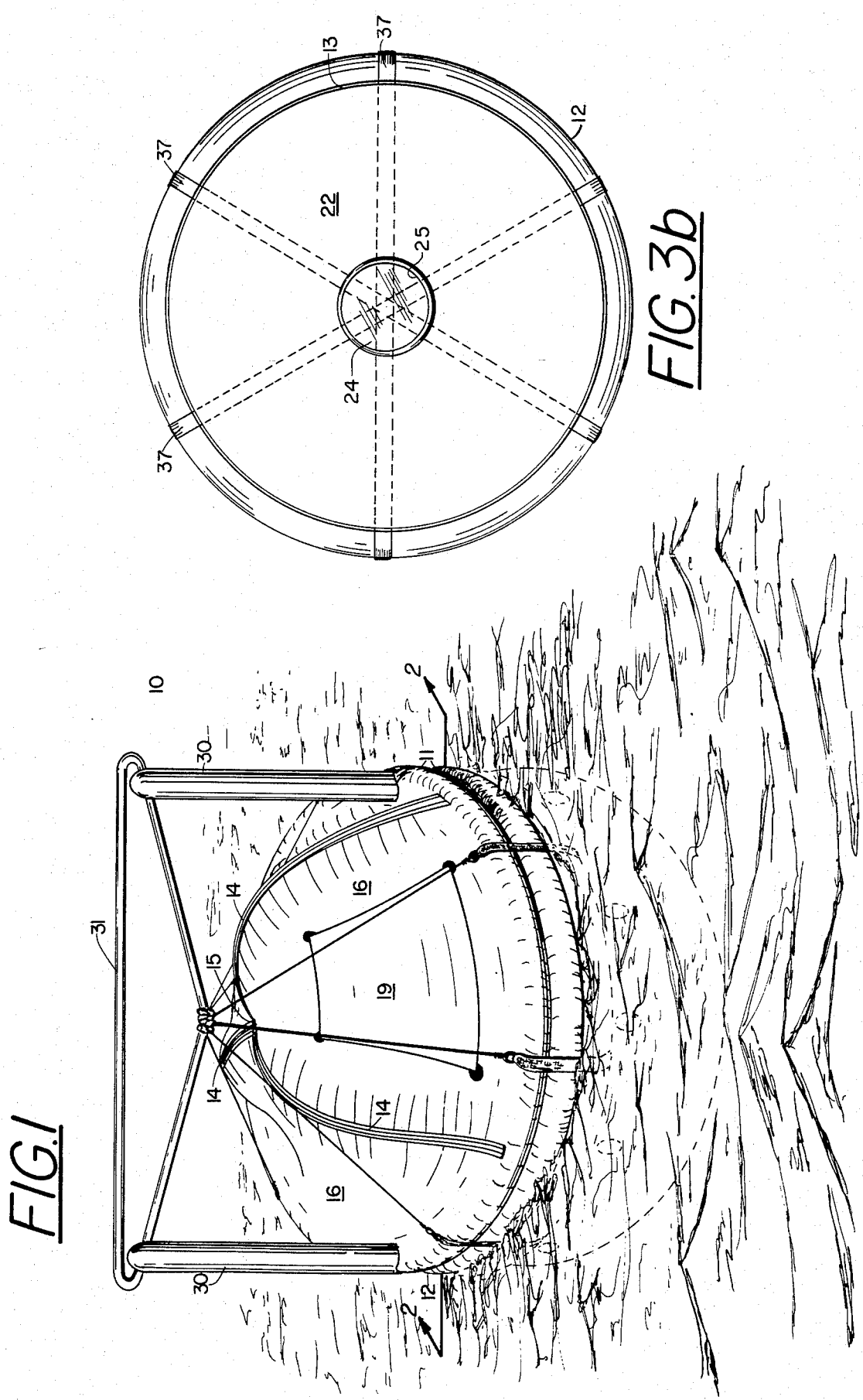
FIG. 1 is an isometric depiction of one embodiment of the invention floating on the water's surface.

Referring now to the drawings and in particular to FIGS. 1 and 2, an improved inflatable liferaft 10 is buoyed on the surface of a stormy, windblown ocean. Uninflated, it is small enough to be carried on most surface vessels or airplanes and has been ejected from a stricken craft to protect survivors from the elements and assure their safe recovery.

The raft has several ring-shaped chambers 11 secured to one another in juxtaposed relationship to form a round side 12 for the liferaft. A disc-shaped double-walled bottom portion 13 functions as an insulative layer and is connected about its periphery to the side in a water tight relationship and three equidistantly-spaced inflatable ribs 14 extend upwardly from the side of the raft and join at an apex 15. The inflated ribs have sufficient strength to support a flexible canopy 16 in the shape of a dome. The supportive force exerted by the ribs is sufficient to create three diverging, upwardly facing cusp ridges even when the canopy is buffeted by strong winds and a helicopter's downwash.

Preferably the canopy is double-walled with the interior surface coated with a reflective material 17. A highly satisfactory material that reflects and keeps heat inside the liferaft was developed under the space program and is used on the popular "space blankets". The insides of the side and exposed surface of the bottom portion can be similarly treated to aid in preventing hypothermia.

At least one hatch 18 is provided between a pair of inflatable ribs 14 in the canopy fabric and a hatch cover 19 is fitted to be operable for access and egress and and securable in place to keep out wind and water. Vents, observation ports, handlines, etc., optionally are included to improve the raft's habitability.

The raft side, bottom, canopy and hatch cover are fabricated in accordance with accepted design criteria of long proven worth. In this regard, the disclosed inventive concept is not to be obfuscated by belaboring the repetition of well known and widely used construction techniques and various apparatus for inflating liferafts. Drop stitching of uniform length between the layers of the bottom and the canopy could hold the layers in a preestablished separation when pressurized gas is introduced during inflation. Any of a number of proven gas supplies, gas generators and venting arrangements could be selected for assuring that the sides, ribs, canopy, and floor are erected quickly in an emergency.

An essentially hemispherically shaped shell 22 hangs beneath the bottom of the inflatable liferaft from its lower periphery. The shell is a flexible material having a number of equidistantly spaced openings 23 for allowing water to fill a hemispherically-shaped ballasting chamber. A weighted flapper valve assembly 24 located at the apex of the hemispherical shell permits a one-way flow of water through a passageway 25 into the ballasting chamber. When the liferaft is deployed, the weight of the flapper valve tends to pull the hemispherical shell downward drawing water through the passageway normally covered by the flapper valve and through the several equidistantly spaced openings. The bag quickly fills with several thousand pounds of water and gives it sufficient mass to resist the unstabilizing effects of wind and surface waves.

High winds and waves pose a very serious threat to conventional flat bottomed rafts or even rafts having a number of small ballasting buckets about their edges for they have been flipped over by them. Tragically, a helicopter's hundred and twenty knot plus downwash has been known to flip over rafts as the helicopter makes its approach for a rescue. The ballasting chamber entrains a sufficient mass so that the raft safely rides out unstabilizing forces, be they natural or man-made.

A plurality of essentially triangularly-shaped openings 26 are provided about the passageway near the lowest part of the hemispherical shell. These are covered by triangular covers 27 which coincide or slightly exceed the dimensions of the openings. The triangular covers are secured in a normal closing position over the triangular openings by preweakened sections of the hemispherical shell material itself, by being bonded with an adhesive having a lower tensile bonding force than the material's breaking strength or by being secured by mating sections of a predetermined strength fastener such as Velcro or the equivalent.

In any event, the manner of fixing of the triangular covers over the triangular openings is such that parting or failure will occur between the openings and their covers when a predetermined tensile force has been exceeded. The predetermined force is generated by a pressure differential created between the inside of the ballasting chamber and the outside as the liferaft is lifted from the water. When failure occurs, ballasting water is dumped rapidly through the triangular openings, the reason for which to be elaborated on below. For larger rafts the orientation of the triangles is as shown to ensure faster water dumping. For other designs an apex of each triangle could be down so that the separated sides could be mended for the raft's reuse. The openings could be other than triangularly shaped.

A pair of inflatable stanchions 30 extend upwardly from opposite sides of the inflatable liferaft and serve to releaseably hold and position an enlarged hoisting ring 31 safely above the canopy. The hoisting ring optionally is either flexible or rigid and is sufficiently dimensioned to enable a helicopter hoisting hook to engage it and pull it from the inflatable stanchions.

A harness 35 is coupled to the hoisting ring and, in the embodiment depicted in the drawings, has six lines 36 reaching down over the sides of the canopy. The lines optionally are each secured to continuing lengths of webbing 37 which radially converge on the ventral side of bottom portion 13. The lines themselves could have wrapped under bottom portion instead of the webbing lengths, although from a packaging standpoint, the webbing shows more promise. Irrespective which is chosen the harness cradles the liferaft from beneath the bottom portion.

The disclosed embodiment is ideally suited for a helicopter's recovery of the liferaft, intact with the occupants safely inside. A helicopter can quickly approach the liferaft and, after grounding its hoisting hook to prevent a possibly hazardous discharge of static electricity, its hook engages large hoisting ring 31 disposed safely above the canopy. The ring is pulled from inflatable stanchions 30 and the slack is taken up in lines 36. The extensions of the lines, webbing 37 or just continuation of the lines themselves, cradle the sides, bottom, and enclosed occupants. As the helicopter begins hoisting the liferaft from the water, the pressure differential caused by the weight of water in the ballasting chamber and the suction created as the hemispherical shell is pulled from the water, parts the connections between the triangular openings and their triangular covers. The several thousand pounds of entrained ballasting water are quickly dumped allowing the liferaft to be plucked from the water surface, note FIG. 5 in this regard.

Figure 6:
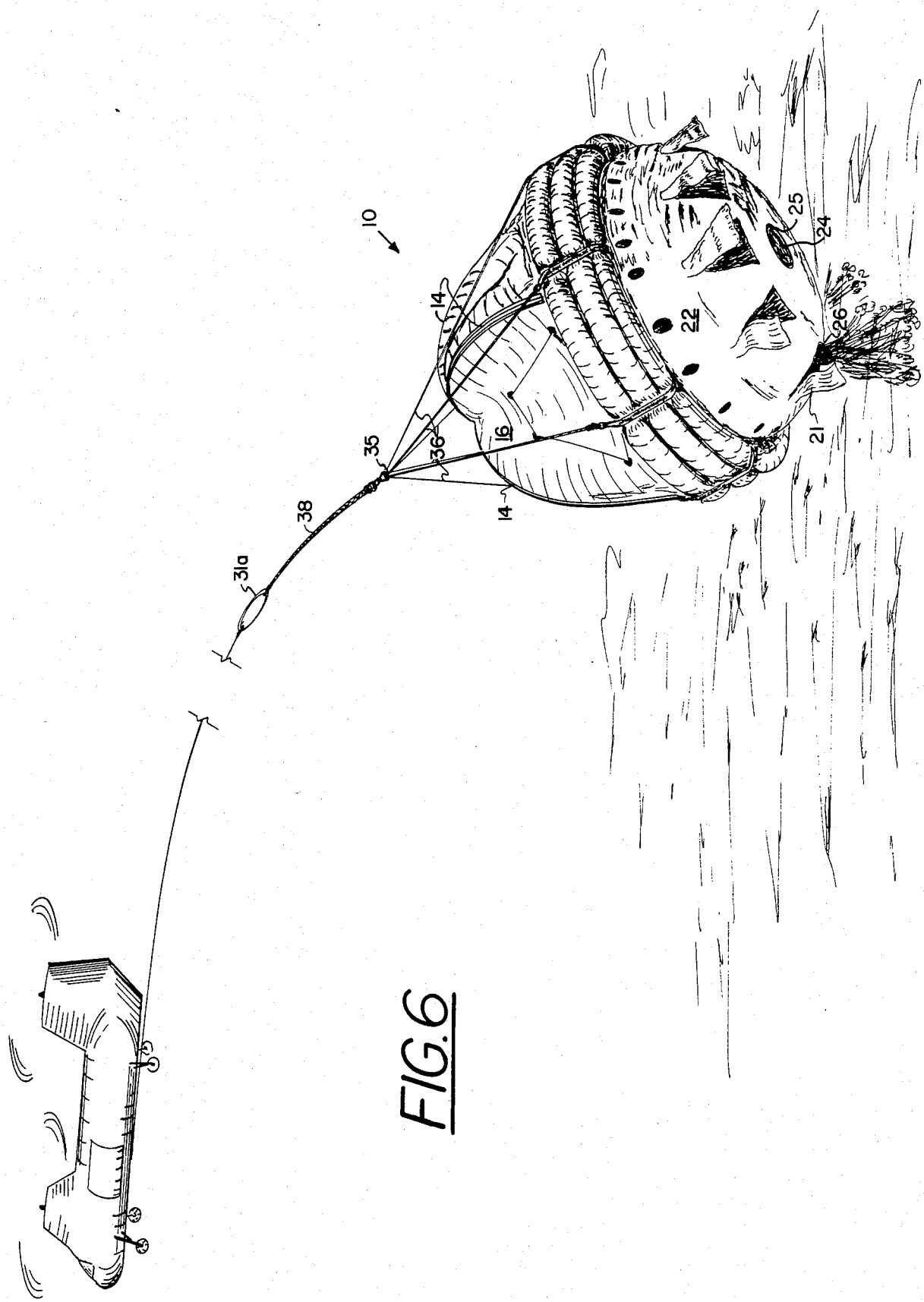
FIG. 6 depicts an airborne towing of the liferaft to a remote medical facility.

The helicopter begins towing the disaster victims rapidly to a nearby hospital, see FIG. 6. As the helicopter's downwash and the airstream beat down on the canopy, inflatable ribs 14 shape the canopy's fabric in three upwardly facing cusps which is an aerodynamically stable configuration for towing. That is, the exposed upper contours of the canopy stabilize the passage of the towed liferaft through the air. This is because the harness is not coupled to the canopy and by cradling the liferaft, squids the shape as the ribs create the aerodynamically proven exposed surface in reaction to the airstream.

The survivors in the raft are not spun about nor buffeted back and forth as they approach safety. The harness reaching beneath the bag cradles it and squids its shape to present a more streamline shape for higher speed towing. At the medical facility, the entire raft is set down and medical attention can start immediately.

Figure 5:
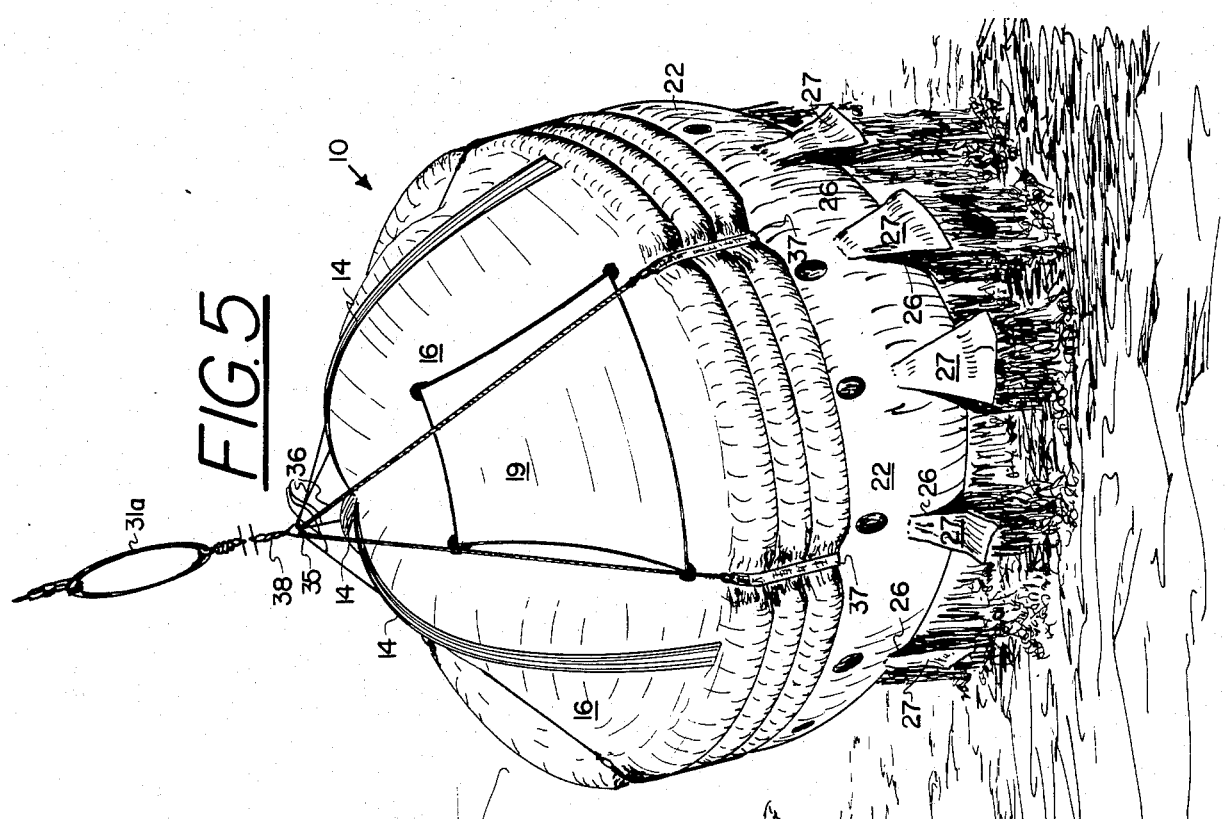
FIG. 5 depicts the raising of the liferaft from the water and dumping its ballasting chamber via the modified pickup arrangement of FIG. 4.
Figure 4:
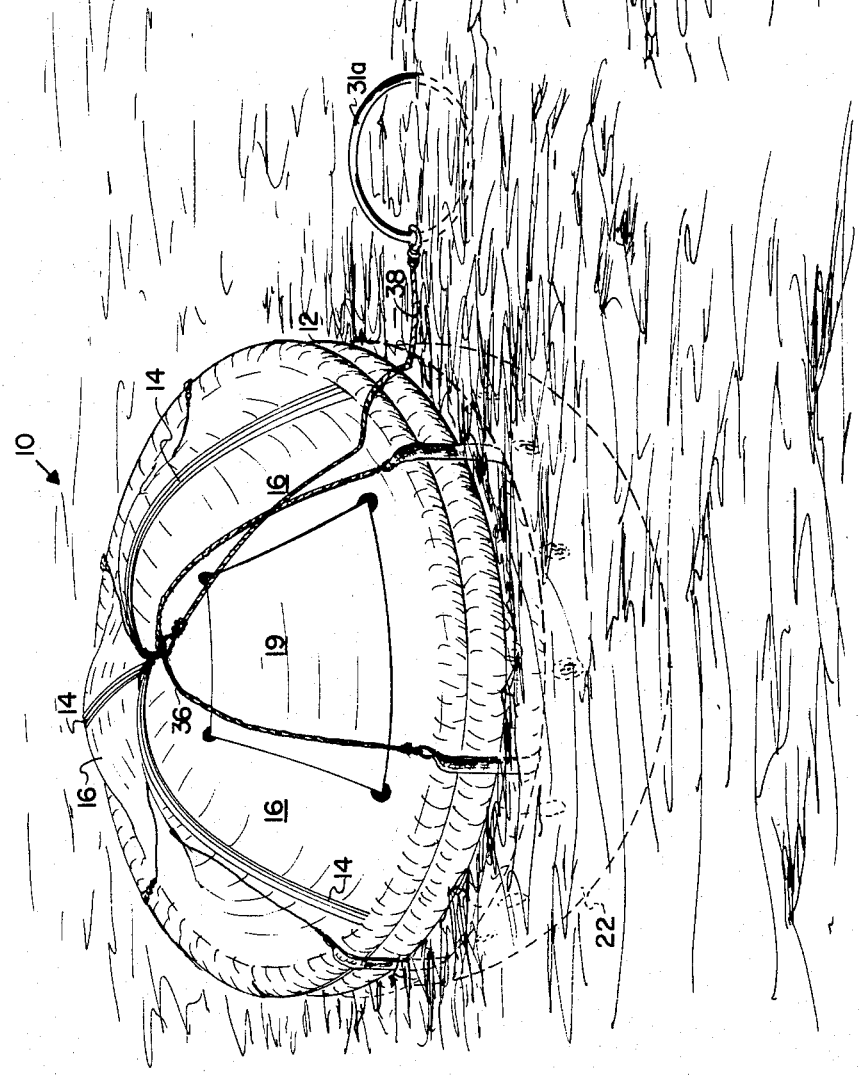
FIG. 4 shows another embodiment of the invention having a modified pickup arrangement.

An alternative is shown in FIGS. 4 and 5 in which the hoisting ring 31a is at least partially buoyant so that the ring may float either flat on the water's surface or extend above and below it, the latter improves the odds for a first pass hookup. A painter line 38 joins the hoisting ring to the termination of harness 35. In exceptionally adverse weather conditions where a pilot might not want to risk injuring the raft's occupants with the hook, the hoisting eye can be thrown some distance from the raft to allow a safer hookup. After hookup, the rescue procedure is much the same as that outlined above.

Obviously, many other modifications and variations of the present invention are possible in the light of the above teachings. It is therefore to be understood that within the scope of the appended claims the invention may be practiced otherwise than as specifically described.

What is claimed is:

1. In an improved liferaft having a base supporting a continuous side above and a water filled ballasting chamber below for protecting survivors from exposure, an improvement therefor is provided comprising:
    means extending beneath and across the base and terminating above it for cradling the base, sides and survivors;
    means coupled to the cradling means at its termination above the base and sides for positioning a portion to engage a lifting hook;
    means disposed on the ballasting chamber for providing at least one opening for dumping water from the ballasting chamber as the liferaft is lifted from the water by the lifting hook; and
    means having three radially extending inflatable ribs supporting a covering which is coupled at its lower edge to the sides to form a protective enclosure for creating an aerodynamically stable body as the liferaft is being towed through the air after it has been lifted from the water, the covering is provided with an internally exposed layer that reflects heat in the interior to help prevent hypothermia, the cradling means has portions radially converging beneath and across the base and radially converges at the termination above the base and separated from and above the aerodynamically stable body creating means and the opening providing means is at least one panel having means between at least a portion of its periphery and the sides of the ballasting chamber for parting being subject to a predetermined pressure differential.

2. An improved liferaft according to claim 1 in which the parting means is a strip of the material around at least a portion of each panel having a tensile strength that will fail as the liferaft is being lifted from the water to allow dumping of water from the ballasting chamber.

3. An improved liferaft according to claim 1 in which the parting means are mating sections of a separable material such as Velcro fashioned to have a parting strength for separating as the liferaft is being lifted from the water to allow dumping of water from the ballasting chamber.

4. An improved liferaft according to claim 1 in which the portion positioning means is an inflatable structure locating a hoisting eye connected to the radially converging termination in a position prominently above the liferaft, the hoisting eye sized to present a viable hook-up target for a helicopter borne lifting hook.

5. An improvement according to claim 1 in which the portion positioning means is a painter line attached to the radially converging termination and coupled to an at least partially buoyant hoisting eye disposed at the water's surface some distance from the liferaft and sized to present a viable hook-up target for a helicopter borne lifting hook.

6. In an improved liferaft having a base supporting a continuous side above and a water filled ballasting chamber below for protecting survivors from exposure, an improvement therefor is provided comprising:
   means extending beneath and across the base and terminating above it for cradling the base, sides and survivors;
   means coupled to the cradling means at its termination above the base and sides for positioning a portion to engage a lifting hook;
   means disposed on the ballasting chamber for providing at least one opening for dumping water from the ballasting chamber as the liferaft is lifted from the water by the lifting hook; and
   means having three radially extending inflatable ribs supporting a covering which is coupled at its lower edge to the sides to form a protective enclosure for creating an aerodynamically stable body as the liferaft is being towed through the air after it has been lifted from the water, the covering is provided with an internally exposed layer that reflects heat in the interior to help prevent hypothermia, the cradling means has portions radially converging beneath and across the base and radially converges at the termination above the base and separated from and above the aerodynamically stable body creating means and the portion positioning means is an inflatable structure locating a hoisting eye connected to the radially converging termination in a position prominently above the liferaft, the hoisting eye sized to present a viable hook-up target for a helicopter borne lifting hook.

7. In an improved liferaft having a base supporting a continuous side above and a water filled ballasting chamber below for protecting survivors from exposure, an improvement therefor is provided comprising:
   means extending beneath and across the base and terminating above it for cradling the base, sides and survivors;
   means coupled to the cradling means at its termination above the base and sides for positioning a portion to engage a lifting hook, the portion positioning means is a painter line attached to the radially converging termination and coupled to an at least partially buoyant hoisting eye disposed at the water's surface some distance from the liferaft and sized to present a viable hook-up target for a helicopter borne lifting hook;
   means disposed on the ballasting chamber for providing at least one opening for dumping water from the ballasting chamber as the liferaft is lifted from the water by the lifting hook; and
   means having three radially extending inflatable ribs supporting a canopy covering which is coupled at its lower edge to the sides to form a protective enclosure for creating an aerodynamically stable body as the liferaft is being towed through the air after it has been lifted from the water, the canopy covering is provided with an internally exposed layer that reflects heat in the interior to help prevent hypothermia, the cradling means has portions radially converging beneath and across the base and radially converges at the termination above the base and separated from and above the aerodynamically stable body creating means.

* * * * *